Figure 1:
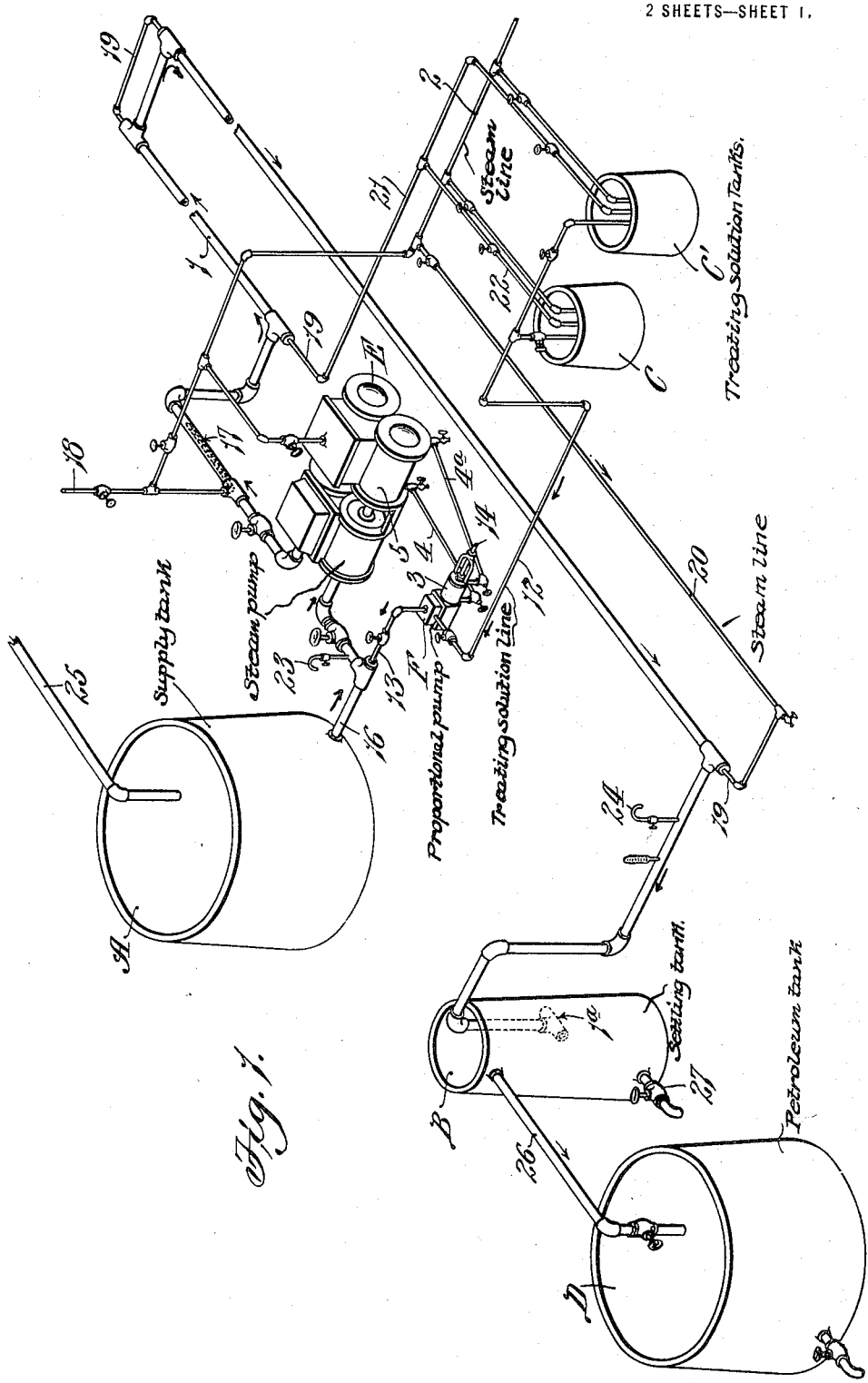

W. S. BARNICKEL.
APPARATUS FOR TREATING NATURAL EMULSIONS OF PETROLEUM.
APPLICATION FILED AUG. 5, 1918.

1,428,204.

Patented Sept. 5, 1922.
2 SHEETS—SHEET 1.

Inventor,
William S. Barnickel.
By Bakewell & Chuck attys.

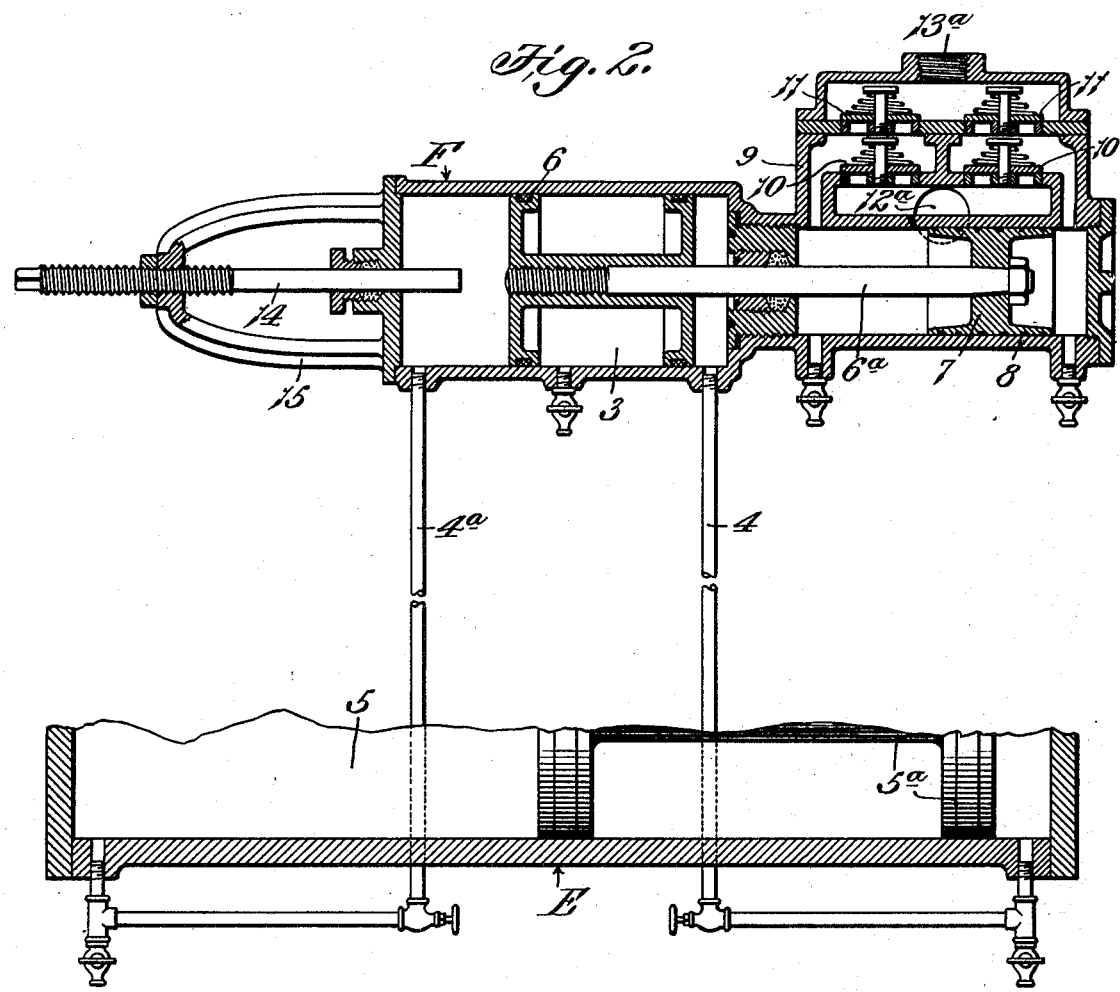
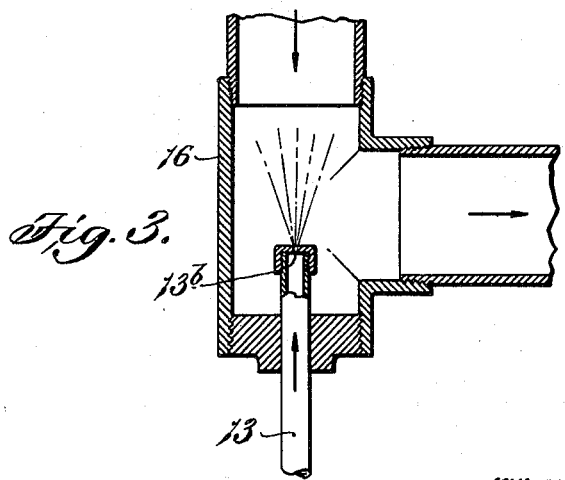

Patented Sept. 5, 1922.

1,428,204

UNITED STATES PATENT OFFICE.

WILLIAM S. BARNICKEL, OF ST. LOUIS, MISSOURI.

APPARATUS FOR TREATING NATURAL EMULSIONS OF PETROLEUM.

Application filed August 5, 1918. Serial No. 248,422.

*To all whom it may concern:*

Be it known that I, WILLIAM S. BARNICKEL, a citizen of the United States, residing at St. Louis, Missouri, have invented a certain new and useful Improvement in Apparatus for Treating Natural Emulsions of Petroleum, of which the following is a full, clear, and exact description, such as will enable others skilled in the art to which it appertains to make and use the same.

This invention relates to the treatment of natural emulsions of petroleum of the kind referred to in my prior United States Patent No. 1,223,659, dated April 24, 1917, wherein I have described a process for treating bottom settlings, roily oil and other kinds of natural oils and residues from natural oils which contain more or less of the substances that roily oil and bottom settlings are composed of. The process described in my prior patent above referred to, briefly stated, consists in treating in any suitable manner bottom settlings, roily oil or any other natural oils or residues from same of a similar nature with an agent or agents that change the composition of the contained mineral salts and isolates the foreign organic matter, thus leaving the oil free to separate from the water, brine and foreign matter in the natural way, by gravity.

One object of my present invention is to provide an apparatus of novel construction for treating bottom settlings, roily oil and other natural oils or residues from the same of a similar nature that makes it possible to supply just the required quantity of treating agent to the oil or mixture being treated, and furthermore, insures the treating agent being thoroughly mixed with or distributed through said oil or mixture.

Another object is to provide a practicable apparatus for carrying out efficiently, continuously and economically the process covered broadly by my prior U. S. patent previously referred to.

Another object is to provide an apparatus for treating large quantities of roily oil, bottom settlings and mixtures or emulsions of a similar nature, which, after being set in operation, operates practically automatically.

Another object is to provide an apparatus for the purpose described that can be constructed at a low cost from material that is usually available on oil leases and oil tank farms.

Another object is to provide an apparatus for treating oils and mixtures of the character previously referred to which is so constructed that the supply of agent or material used to treat the oil can be accurately controlled, thereby effecting a great saving in the quantity of treating agent used and also making it practicable to treat oil continuously as it flows from a well or from a storage tank of great capacity, such, for example, as a 55,000 barrel tank. Other objects and desirable features of my invention will be hereinafter pointed out.

Figure 1 of the drawings is a perspective view, illustrating an apparatus constructed in accordance with my present invention;

Figure 2 is a sectional view, illustrating the construction of the proportional pump that is used for subdividing the treating agent into separate portions and introducing said portions into separate portions of the oil or mixture being treated; and Figure 3 is a detail view, illustrating the device that I prefer to use for injecting the treating solution into the mixture.

My present apparatus can be successfully used for treating bottom settlings, roily oil and other kinds of natural oils and residues from natural oils which contain more or less of the substances that roily oil and bottom settlings are composed of so as to separate and recover practically all of the contained petroleum, but for brevity I have used the term oil mixtures of the character described to mean oils, emulsions or oil mixtures of the character above referred to. My present apparatus is used for practicing a process which, briefly stated, consists in sub-dividing the mixture to be treated into separate portions and individually treating each of said portions with a water-softening agent capable of precipitating the alkaline earths present in the mixture, the water-softening agent acting to change the composition of the mineral salts and isolating the foreign organic matter, thus leaving the petroleum free to separate from the water, brine and foreign matter in the natural way, by gravity. Any of the various water-softening agents referred to in my prior U. S. patent, as well as other chemical reagents, can be used in practicing my present process, and the water-softening agent can be introduced into the mixture in solution or in any other preferred manner. The apparatus that I have devised for practicing the process above described comprises any suitable means for sub-dividing the mixture into separate portions and any suitable means for sub-dividing a supply of treating agent into individual portions and introducing one portion of treating agent into one portion of mixture and thoroughly distributing it through same. I prefer to use a steam pump of the piston type for drawing the mixture out of a supply tank and forcing the mixture through a conduit that leads to a settling tank, and I prefer to use a proportional pump operated by the steam that is admitted to the cylinder of the mixture pump for drawing the treating agent consisting of a suitable soluble water-softening agent from a source of supply and introducing it into the mixture preferably before the mixture passes through the steam pump. The particular details of construction of the apparatus are immaterial, so far as my broad idea is concerned, and therefore, I do not wish it to be understood that my invention is limited to an apparatus of the particular construction herein illustrated.

Referring to the drawings which illustrate the apparatus that I prefer to use, A designates a tank or receptacle that contains the mixture to be treated, B designates a settling tank into which the mixture is introduced after it has been treated, C designates a tank for holding the treating agent, preferably consisting of a suitable water-softening agent in solution, and D designates a tank for receiving the petroleum that separates from the brine, water and organic matter in the mixture after the mixture has been introduced into the settling tank B. The mixture is drawn out of the tank A and forced through a conduit or pipe line 1 that leads to the settling tank by means of a pump E, preferably a steam pump, to which steam is supplied from a steam supply line 2. By handling the mixture in this manner I sub-divide the mixture into separate portions, each of which portions is individually treated with the treating solution. The treating solution is drawn out of the tank C and introduced into the mixture that escapes from the tank A by means of a proportional pump F, preferably a steam pump, that is combined with the mixture pump E in such a manner that it operates in unison with same. The proportional pump F may be of any preferred type or construction, so long as it will operate to subdivide the treating solution into separate portions and introduce each of said portions into a sub-divided portion of the mixture being treated, but I prefer to use a proportional pump of the kind illustrated in Figure 2 of the drawings which comprises a cylinder 3 whose opposite ends are connected by means of pipes 4 and $4^a$ with the opposite ends of the cylinder 5 of the mixing pump E, a reciprocating piston 6 in the cylinder 3 whose rod or stem $6^a$ is connected to a plunger 7 arranged in a cylinder 8, a valve casing 9 on the cylinder 8 provided with a pair of inlet valves 10 and a pair of discharge valves 11, an inlet pipe 12 leading from the treating solution tank C to an inlet port $12^a$ in said valve casing 9 and a discharge pipe 13 leading from a discharge port $13^a$ in said valve casing to the point where the treating solution is introduced into the mixture. When steam is admitted to one end of the cylinder 5 of the mixture pump E by the usual D-valve with which the pump E is equipped, the piston $5^a$ in the cylinder of the mixture pump and the piston 6 in the cylinder of the proportional pump will move simultaneously in the same direction, due to the fact that the pipes 4 and $4^a$ connect the opposite ends of the cylinders of said pumps together. The movement of the piston of the proportional pump causes the plunger 7 to reciprocate in its cylinder 8, and accordingly, one of the inlet valves 10 will open and admit a charge of treating solution to the cylinder 8 and one of the discharge valves 11 will open and permit the charge of treating solution previously drawn into the cylinder 8 to escape therefrom through the discharge pipe 13. On the reverse stroke of the piston of the mixture pump E the piston 6 of the proportional pump F will move in the opposite direction and thus cause a charge of treating solution to be drawn into the cylinder 8 and a charge of treating solution to be forced out of said cylinder through the discharge pipe 13. The proportional pump F is constructed in such a manner that it will pump an exceedingly small amount at each cycle of operations in comparison with the quantity pumped by the mixture pump E, but it is so constructed and combined with the mixture pump E that it will pump proportionately the same amount at each cycle of operations, thereby causing each sub-divided portion or quantity of the mixture to be treated with a definite quantity of the treating solution. In order that the process may be accurately controlled the proportional pump F is so constructed that the operator in charge of the apparatus can either increase or decrease the quantity of treating solution supplied by the proportional pump without shutting down the apparatus or varying the stroke of the mixture pump E. In the proportional pump shown in Figure 2 the quantity of treating solution handled by the pump is governed by means of a manually-adjustable stop or abutment 14 that projects inwardly through a stuffing box in the head of the cylinder 3, said stop being adjustably mounted in a yoke 15 on the head of said cylinder. If it is desired to diminish the quantity of treating solution supplied by the proportional pump F the operator screws the stop 14 inwardly so as to cut down the stroke of the piston 6. If it is desired to increase the quantity of treating solution handled by said pump the stop 14 is moved in the opposite direction so as to increase the stroke of the piston 6 of the pump. This can be effected while the pump is in operation, and furthermore, any change in the adjustment of the proportional pump F will have absolutely no effect on the mixture pump E. Consequently, by manipulating the adjustable stop 14 of the proportional pump, the operator in charge of the apparatus can accurately regulate the quantity of treating solution that is supplied to each separate portion of the mixture, thereby effecting a great saving in the quantity of the treating solution used and also producing a more perfect separation of the component parts of the mixture, due to the fact that neither too much nor too little treating solution is used.

It is immaterial in what manner the treating solution is introduced into the mixture, but I prefer to introduce the treating solution into the mixture before the mixture passes through the pump E, and furthermore, in such a manner that the treating solution will be distributed quite thoroughly through the mixture, even before the mixture passes through the pump.

To this end I have provided the discharge pipe 13 of the proportional pump with a nozzle 13$^b$ that enters the discharge pipe 16 leading from the tank A, said nozzle being provided with one or more orifices so that the treating solution will be discharged from same under pressure and in an opposite direction to the flow of the mixture that is being drawn out of the tank A by the pump E. By injecting the treating solution into the mixture under pressure in the manner just described and thereafter passing the treated mixture through the pump E, I obtain a very thorough and complete distribution of the treating solution through the mixture, but in order to further increase the distribution of the treating solution through the mixture and cause the treating solution to come in contact with all portions of the mixture, I have provided the apparatus with means for agitating the treated mixture after it has passed through the pump E. Said means consists of a nozzle or perforated pipe 17 arranged in the conduit 1 and connected either with a supply of steam or with a supply of gas, so as to cause the treated mixture to be subjected to the action of a plurality of jets of steam or gas after it has passed through the pump E. As shown in Figure 1, the nozzle or perforated pipe 17 can either be supplied with steam from the main steam supply pipe 2, or supplied with gas from a gas supply pipe 18. In order to reduce the viscosity of the mixture the pipe line or conduit 1 through which the treated mixture travels to the settling tank B is provided with a heating means, preferably consisting of a steam pipe or pipes 19 arranged inside of same at suitable points and supplied with steam from a branch 20 leading from the main steam supply pipe 2. The steam that condenses in the heating pipe 19 is preferably collected and used to dissolve the water-softening agent used to treat the mixture, owing to the scarcity of water in some oil fields and also because water of condensation is better adapted for dissolving treating chemicals of the kind contemplated by my process than ordinary hard water. To this end I have provided the apparatus with a condensed water pipe 21 that leads to an auxiliary treating solution tank C'. When the treating solution is being taken from the tank C the water of condensation is allowed to flow into the auxiliary tank C', wherein the next batch of treating solution is being made up. After the supply of treating solution from the tank C has been exhausted the inlet pipe 12 of the proportional pump F is hooked onto the auxiliary tank C'. It is desirable to agitate the treating solution in the supply tank either continuously or intermittently, and in order that this may be accomplished easily, I have provided the main steam supply line 2 with a branch 22 that leads to a nozzle or injecting device arranged in the treating solution tank. The various pipes and lines that connect the essential parts of the apparatus together are equipped with controlling valves and the conduit or pipe line 1 is provided at a point in proximity to the tank A with a test cock 23 and at a point in proximity to the settling tank B with a test cock 24, so as to enable the operator in charge of the apparatus to take samples of the mixture from the pipe line 1 at certain intervals and test same to determine whether too much or too little treating solution is being supplied to the mixture. In order to assist the petroleum to separate rapidly from the water, brine and foreign matter, I have provided the pipe line 1 at the point where it enters the settling tank B with a horizontally-disposed discharge portion 1$^a$, open at both ends, as shown in Figure 1, so that the treated mixture which escapes from same will flow laterally instead of in a downward direction, thereby tending to cause the petroleum to rise to the top of the mass in the settling tank.

One desirable feature of an apparatus of the construction above described is that it can be used for treating a large quantity of mixture, or it can be used for treating oil as it flows from a well. Therefore, I have illustrated the apparatus equipped with a pipe 25 that leads from a well to the tank A, so as to supply oil or an oil mixture to said tank continuously. When the apparatus is in operation the pump E draws a certain quantity of mixture from the tank A at each cycle of operations and forces it through the pipe line 1. The proportional pump F operates in unison with the pump E and introduces into each charge of mixture that is drawn out of the tank A a sufficient quantity of treating solution to effect the separation of the component parts of the mixture when it is subsequently allowed to stand in a quiescent state in the settling tank B. The manner in which the treating solution is introduced into the mixture, namely, under pressure and in an opposite direction to the flow of the mixture from the supply tank; the fact that the treated mixture is thereafter passed through a pump and the fact that the treated mixture is thereafter agitated by jets of steam or gas, insures every portion of the mixture being brought in contact with the treating solution before the treated mixture enters the settling tank, the mixture being heated while it is traveling through the pipe line 1 to the settling tank. When the treated mixture enters the settling tank the component parts of same tend to separate, the petroleum which is usually from thirty to sixty per cent of the total bulk rising to the top of the mass, the brine, water and mud, if any mud is present, settling to the bottom of the tank, and the organic matter forming a thin layer between the brine and the petroleum. The petroleum is conducted out of the settling tank into the tank D through the pipe 26 that leads from the upper end of the settling tank, and the water and brine at the bottom of the settling tank escape from same continually through the drain cock 27. From time to time the drain cock is opened wide enough to permit some of the organic matter to escape from the settling tank, but this is only done at infrequent intervals, as it is desirable to always maintain a layer of organic matter between the petroleum and the brine, water and mud at the bottom of the settling tank. When the apparatus is first put into operation the operator takes samples of the mixture from the test cocks 23 and 24 and tests same, so as to determine whether the proper quantity of treating solution is being supplied. If the mixture is uniform it will not be necessary to change the adjustment of the proportional pump, but if the mixture is being drawn from a tank of great capacity, such, for example, as a 55,000 barrel tank, or if the source of supply is being taken from a well, the mixture will vary, and thus necessitate frequent adjustments of the proportional pump, so as to not use too much treating solution or use too little treating solution to produce the best results.

An apparatus of the construction above described insures a thorough and efficient treatment of the mixture, due to the fact that the supply of mixture is sub-divided into separate portions and each separate portion is individually treated with a definite quantity of treating solution. Furthermore, said apparatus makes it practicable to treat oil continuously, as it flows from a well, or to treat a large amount of oil or oil emulsion that is not at all uniform in composition. The apparatus herein illustrated and described can be accurately controlled; it can be built at a low cost from material that is generally available on oil leases and tank farms, owing to the fact that the only part of the apparatus which is not usually found on an oil lease is the proportional pump F and it is capable of handling and successfully treating, at a low cost, large quantities of oil or oil mixtures of the character previously referred to.

Having thus described my invention, what I claim, and desire to secure by Letters Patent, is:

An apparatus for treating oil mixtures of the character described, comprising a supply tank, a settling tank, a conduit leading from said supply tank, to said settling tank, a steam pump for drawing an oil mixture out of said supply tank and forcing it through said conduit, a treating solution tank, a proportional pump operated by said steam pump for drawing the treating solution from said tank and introducing it into the oil mixture before said mixture passes through the steam pump, means for agitating the treated mixture while it is flowing through said conduit, a steam pipe in said conduit for heating the treated mixture, and means for conducting the water of condensation from said steam pipe to a treating solution tank.

WILLIAM S. BARNICKEL.